(12) United States Patent
Hopwood et al.

(10) Patent No.: US 7,900,687 B2
(45) Date of Patent: Mar. 8, 2011

(54) APPARATUS AND METHOD FOR MOULDING BATTERY GROUP STRAPS

(75) Inventors: Robert T. Hopwood, Cheltenham (GB); Simon A. Britton, Cheltenham (GB)

(73) Assignee: TBS Engineering Limited, Cheltenham (GB)

( * ) Notice: Subject to any disclaimer, the term of this patent is extended or adjusted under 35 U.S.C. 154(b) by 391 days.

(21) Appl. No.: 12/280,895

(22) PCT Filed: Apr. 3, 2007

(86) PCT No.: PCT/GB2007/001183
§ 371 (c)(1), (2), (4) Date: Oct. 16, 2008

(87) PCT Pub. No.: WO2007/128958
PCT Pub. Date: Nov. 15, 2007

(65) Prior Publication Data
US 2009/0218069 A1      Sep. 3, 2009

Related U.S. Application Data

(60) Provisional application No. 60/744,356, filed on Apr. 6, 2006.

(30) Foreign Application Priority Data

Apr. 7, 2006 (GB) .................................. 0607055.1

(51) Int. Cl.
*B22D 37/00* (2006.01)

(52) U.S. Cl. ............... 164/457; 164/133; 164/151.3; 164/155.2

(58) Field of Classification Search .......... 164/133–136, 164/335–337, 457, 150.1, 151.3, 155.2, 156.1
See application file for complete search history.

(56) References Cited

U.S. PATENT DOCUMENTS

| | | |
|---|---|---|
| 3,718,174 A | 2/1973 | Hull et al. |
| 4,573,514 A | 3/1986 | Wolf et al. |
| 5,232,044 A | 8/1993 | Malle |

FOREIGN PATENT DOCUMENTS

| | | |
|---|---|---|
| GB | 1 005 313 | 9/1965 |
| GB | 1 351 354 | 4/1974 |
| GB | 2 023 471 | 1/1980 |

OTHER PUBLICATIONS

International Search Report for Application No. PCT/GB07/001183 dated Aug. 27, 2007.
Search Report for Application No. GB 0607055.1 dated Aug. 8, 2006.

*Primary Examiner* — Kuang Lin
(74) *Attorney, Agent, or Firm* — Marshall, Gerstein & Borun LLP

(57) ABSTRACT

This invention relates to apparatus and methods for molding battery group straps. Molding apparatus, generally indicated at (10), includes a centrally cooled mold block (11) which defines two laterally displaced sets (12, 13) of longitudinal spaced mold cavity (14) and respective lead feed block (15) and (16) having appropriate feed channels. A sensor, in the form of an electrically conducting rod (25), is disposed so that its tip forms one part of the bottom of the mold cavity (14). This can detect as soon as lead enters into the cavity and that detection is used to control the pour time for the lead to a predetermined period, so that the lead entering the cavities is of a constant quantity on each cycle.

15 Claims, 1 Drawing Sheet

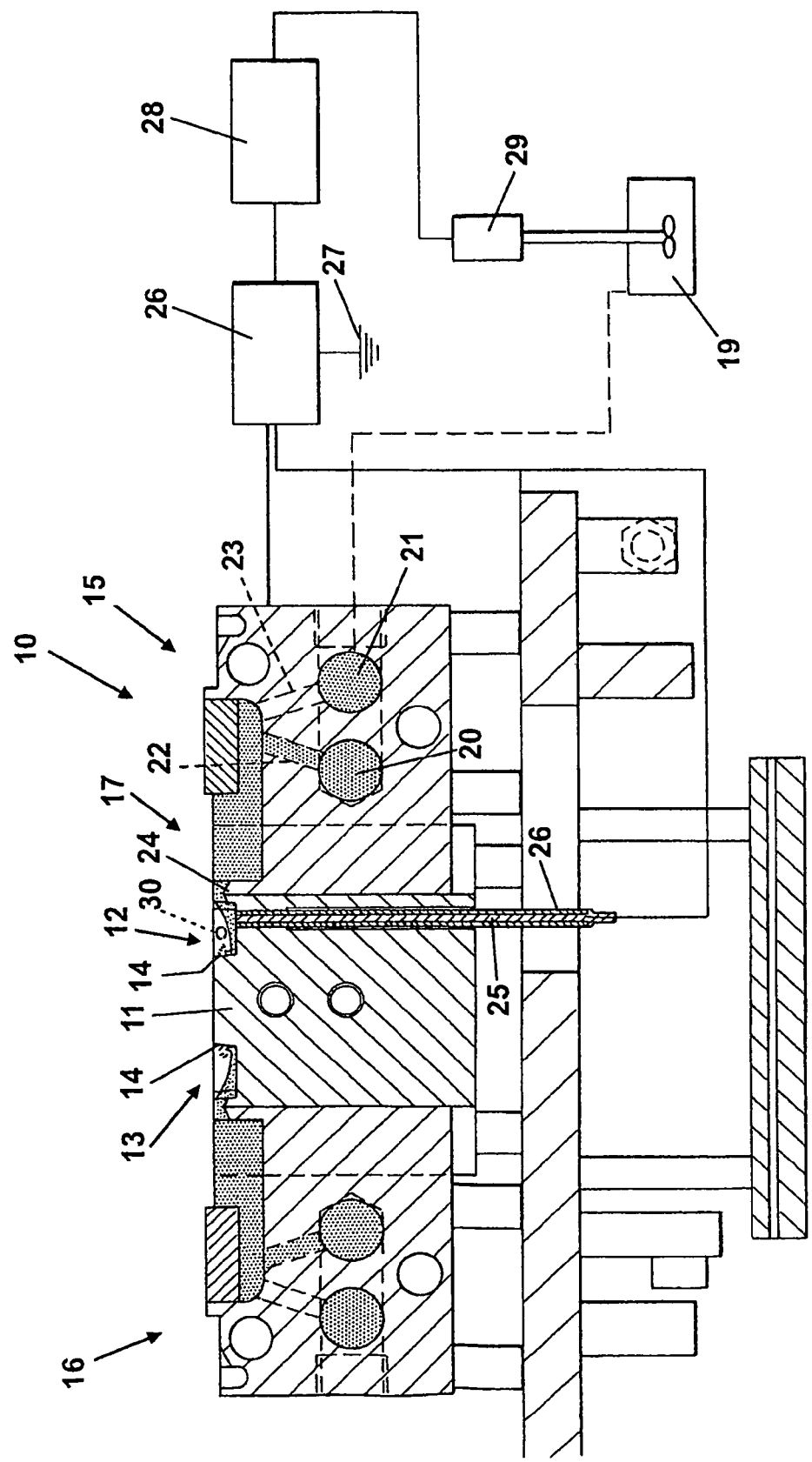

APPARATUS AND METHOD FOR MOULDING BATTERY GROUP STRAPS

BACKGROUND OF THE INVENTION

This invention relates to apparatus and methods for moulding straps on groups of battery plates.

In GB-A-2023471 a moulding system is described in which a mould consists of a number of mould cavities for forming battery straps, which are fed from a single feed channel over respective weirs. The process involves pumping lead into the feed channel from a lead pot so that the lead overflows the weirs and dipping the lugs of the groups of battery plates into respective cavities whilst the lead is still hot. Once the lead has been pumped for a sufficient time to fill the cavities, the pumping is stopped and excess lead flows back into the feed line either under positive pumping or, more usually, as a result of a return valve opening to allow gravitational feed of lead back into the lead pot. If a mould having this so called "tidal flow" characteristic is operated without any battery plates being dipped, the cavities fill very precisely to the level defined by the weirs. However, in practice, the cooling of the lead in the cavity created by the introduction of the solid lugs actually tends to mean that the moulded strap thickness are determined by the amount of lead which is poured into the cavity.

Originally the "tidal flow" system worked well, because machines were operated at a cycle time which allowed the lead in the feed pipe to settle back to a constant datum level. However, automation of many parts of the manufacturing line for batteries, has meant that cycle times have had to be decreased throughout the process and it is frequently the case that during the main running part of the operation of such moulding apparatus the lead in the feed pipe does not fall all the way back to the datum, because the final part of any drain cycle is rather slow. However, when the machine is stopped for maintenance or changing a mould, full drain back does take place. The result is that straps of different thickness are produced depending when, in the production cycle, they are formed.

SUMMARY OF THE INVENTION

From one aspect the invention consists in apparatus for moulding straps on a group of battery plates, including a mould having a mould cavity, a weir forming an input/output for the cavity and a lead feed for feeding lead over the weir and for acting as a lead return for allowing excess lead in the cavity to flow back into the lead feed characterised in that the apparatus further includes a sensor for detecting the presence of lead in the cavity and a controller, responsive to the sensor, for stopping the flow of lead into the cavity a predetermined time after the lead is detected.

In one embodiment the sensor will serve the entry of lead into the cavity in which case it will be understood that by so determining the length of time lead is fed into the cavity, straps of equal thickness can be achieved whatever datum level is established between cycles. In an alternative embodiment the sensor will sense the lead reaching a predetermined level in which case the predetermined time will be very short or effectively zero.

The sensor may include a lead entry detector and a timer responsive to the detector. In that case the timer will produce a control signal for feeding to the controller. In one embodiment the detector may be an electrical contact formed in the cavity and connected in a circuit which is completed when flowing lead touches the contact. Preferably the contact is in or adjacent the bottom of the cavity. In an alternative embodiment the detector may be an optical detector and may for instance detect the initial passage of lead over the weir.

In general there will be a plurality of cavities, but at least in most instances a single detector in a single cavity will suffice.

From another aspect the invention consists in a method for moulding straps on a group of battery plates, including pouring lead into a mould cavity, dipping the straps into the cavity and allowing excess lead to flow out of the cavity characterised in that the method further includes detecting the presence of lead into the cavity and ceasing the inward flow of lead a predetermined time thereafter.

Although the invention has been defined above it is to be understood it includes any inventive combination of the features set out above or in the following description.

BRIEF DESCRIPTION OF THE DRAWING

The invention may be performed in various ways and a specific embodiment will now be described with reference to the accompanying drawing which consists of a schematic cross-section through part of a moulding apparatus and includes a partial circuit diagram.

DETAILED DESCRIPTION OF THE DRAWING

Moulding apparatus, generally indicated at 10, includes a central cooled mould block 11 which defines two laterally displaced sets 12, 13 of longitudinally spaced mould cavities 14 and respective lead feed blocks 15 and 16.

The feed blocks 15, 16 are essentially identical although oppositely sensed and only one feed block, mould set combination will be described.

As can be seen the feed block 15 has a lead feed channel, 17, formed in its upper surface, which communicates with a lead pot 19 via feed pipes 20, 21 and a series of vertical feeds, 22, 23. The feed channel 17 communicates with the mould cavity 40 over the top of a weir 24 as is generally well understood in the art and essentially described in the preamble to this specification.

As has been indicated above, the applicants have realised that the problems of existing apparatus can be overcome by detecting when lead first enters the cavity, pumping the lead for a predetermined time, and then switching off the pump so that lead ceases to pour into the cavity 14. It will be understood that in principle this detection could take place in a number of ways, but it will also be appreciated that the detection is taking place in an extremely aggressive environment and so the detector has to be selected accordingly.

The applicants preferred option is constituted by an electrically conducting rod 25, made of a material with a higher melting point than lead and disposed in the moulding block 11 so that one of its ends forms a part of the bottom of the mould 14. The rod 25 is surrounded by an electrically insulating sleeve 26, which can typically be made of a ceramic material.

The other end of the rod 25 is electrically connected to a timer 26 and then through to earth 27. The timer includes a power source (not shown) which is in turn electrically connected to the lead in the feed channel 17, so that when lead spills over the weir 24 into the base of the cavity 14 it will complete a circuit with the rod 25 causing the timer to be initiated. In order to enhance this contact, the top of the rod 25 may be surrounded by a slight concavity to encourage lead to flow onto the rod 25.

The timer then times a predetermined period, such as half a second, and when that period is up sends an input signal to a controller 28 that switches off the lead pump 29, which has initiated the flow of lead into the cavity, when previously switched on by the controller 28.

It will be understood, therefore, that each pump cycle lasts exactly the same time from the moment at which lead enters the cavity 14 and so the same amount of lead is pumped into the cavity 14, whatever the datum level reached from the previous cycle.

Usually only one rod or probe 25 will be required for any apparatus, because the flow of lead into the cavities 14 is essentially coordinated by the operation of the pump 29. However each set 12, 13 might have a probe and the apparatus may be arranged to produce a warning signal if there is a lead or lag between the lead arrival detection times, which falls outside an allowable error range.

In a further embodiment the sensor (shown in broken line at 30) may be placed so that it detects the lead reaching a certain level in the cavity 14, in which case either the timer will time out very quickly or it can be dispensed with, the predetermined time being that which is taken by the circuit to switch off the pump 29. Care will need to be taken in the positioning of the sensor to prevent a 'false' operation resulting from splashing or turbulent flow and for this reason the first embodiment will usually be preferred.

The invention claimed is:

1. Apparatus for moulding straps on a group of battery plates, comprising a mould having a mould cavity, a weir forming an input/output for the cavity and a lead feed for feeding lead over the weir and for acting as a lead return for allowing excess lead in the cavity to flow back into the lead feed, wherein the apparatus further includes a sensor for detecting the presence of lead into the cavity, a time, responsive to the sensor and a controller, responsive to the timer, for stopping the flow of lead into the cavity a predetermined time after the lead is detected.

2. Apparatus as claimed in claim 1 wherein the sensor detects the entry of lead into the cavity.

3. Apparatus as claimed in claim 2 wherein the sensor includes a lead entry detector and a timer responsive to the detector.

4. Apparatus as claimed in claim 2 wherein the detector is an electrical contact formed in the cavity and connected in a circuit which is completed when flowing lead touches the contact.

5. Apparatus as claimed 4 wherein the contact is in or adjacent the bottom of the cavity.

6. Apparatus as claimed in claim 1 wherein the sensor detects the lead reaching a predetermined level in the cavity.

7. Apparatus as claimed in claim 2 wherein the detector is an optical detector.

8. Apparatus as claimed in claim 7 wherein the optical detector detects the passage of lead over the weir.

9. Apparatus as claimed in claim 1 wherein the mould has a plurality of cavities.

10. Apparatus as claimed in claim 3 wherein the detector is an electrical contact formed in the cavity and connected in a circuit which is completed when flowing lead touches the contact.

11. Apparatus as claimed in claim 6 wherein the detector is an optical detector.

12. Apparatus as claimed in claim 11 wherein the optical detector detects the passage of lead over the weir.

13. A method for moulding straps on a group of battery plates comprising pouring lead into a mould cavity, dipping the straps into the cavity and allowing excess lead to flow out of the cavity, wherein the method further includes using a sensor for detecting the presence of lead into the cavity and ceasing the inward flow of lead a predetermined time thereafter by using a timer responsive to the sensor and using a controller responsive to the timer.

14. A method as claimed in claim 13 wherein the entry of lead into the cavity is detected.

15. A method as claimed in claim 13 when lead reaching a predetermined level in the cavity is detected.

* * * * *